United States Patent

[11] 3,616,920

| [72] | Inventor | Jean Cambot |
| --- | --- | --- |
| | | Palaiseau(Essonne), France |
| [21] | Appl. No. | 842,222 |
| [22] | Filed | July 16, 1969 |
| [45] | Patented | Nov. 2, 1971 |
| [73] | Assignee | Sapir S.A. |
| | | Bienne, Switzerland |
| [32] | Priority | July 26, 1968 |
| [33] | | Switzerland |
| [31] | | 11263/68 |

[54] WATER SOFTENER VALVE DEVICE
6 Claims, 4 Drawing Figs.

[52] U.S. Cl. ........................................... 210/190
[51] Int. Cl. ........................................... B01d 23/26
[50] Field of Search ............................... 210/190, 133

[56] References Cited
UNITED STATES PATENTS
3,255,106  6/1966  Reid et al. ................... 210/190 X
3,335,752  8/1967  Hiers et al. .................. 210/190 X

*Primary Examiner*—J. L. De Cesare
*Attorneys*—Harry C. Bierman, Jordan B. Bierman and Bierman and Bierman ABSTRACT: A valve device adapted to be associated with the reservoir of a water softener operating according to the ion exchange resin method, this device, comprising two ducts, namely an inlet duct for the water to be treated and a treated-water outlet duct interconnected by a bypass controlled by a reversing valve responsive to a control piston. The operation of this device is controlled by means of two valves adapted to be actuated by any suitable mechanism for simultaneously moving said valves either to their closed position or to their open position, said valves being inserted in two branch lines extending from said inlet duct respectively upstream and downstream of said reversing valve, and leading the first one to the chamber containing the piston controlling said reversing valve, and the other one to a drain duct. A third branch line is provided between said outlet duct and an orifice opening into said reservoir for delivering rinsing water thereto, and a product for regenerating the treatment resins when both control valves are in their closed position, whereby the direction of flow in said reservoir is reversed.

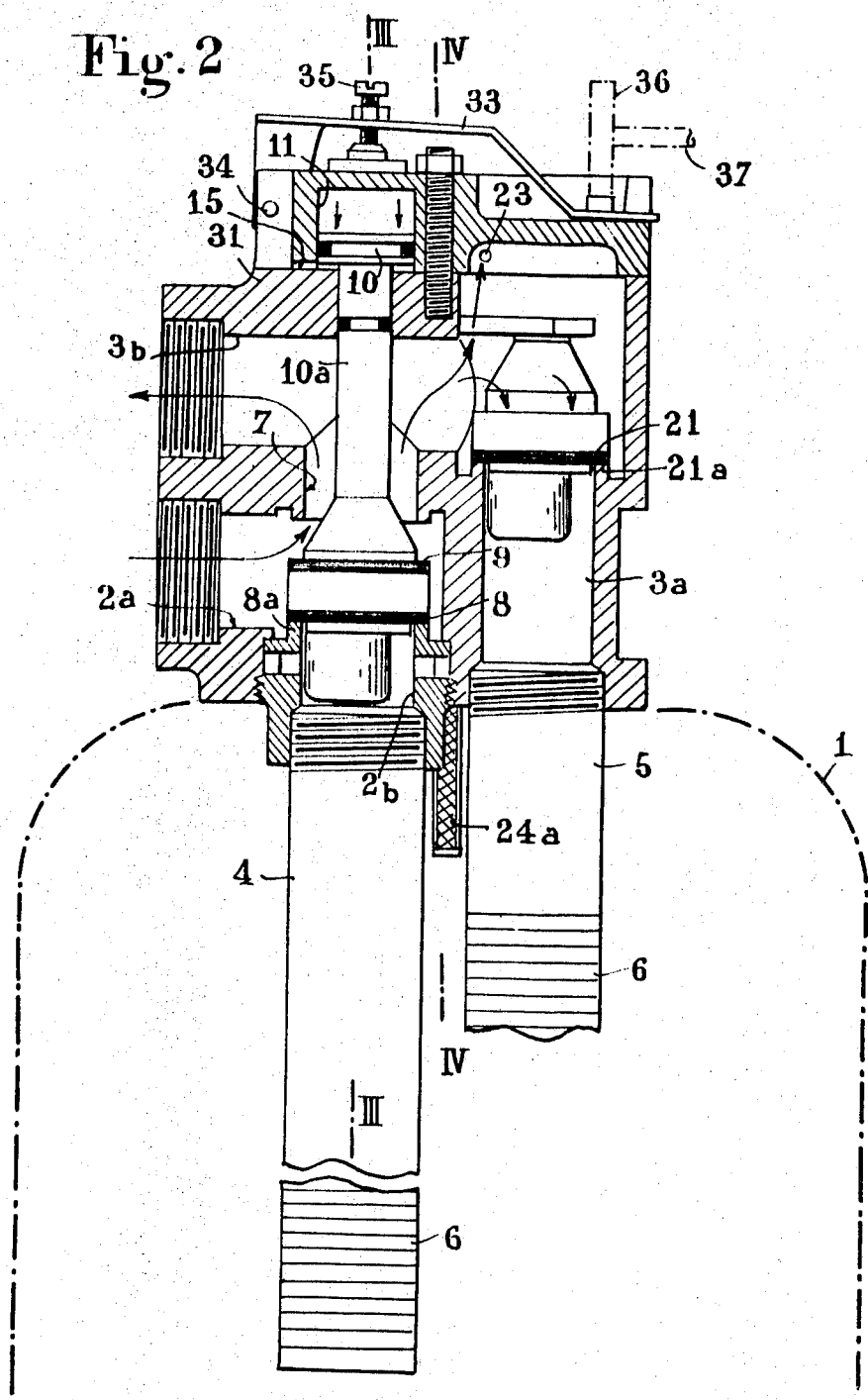

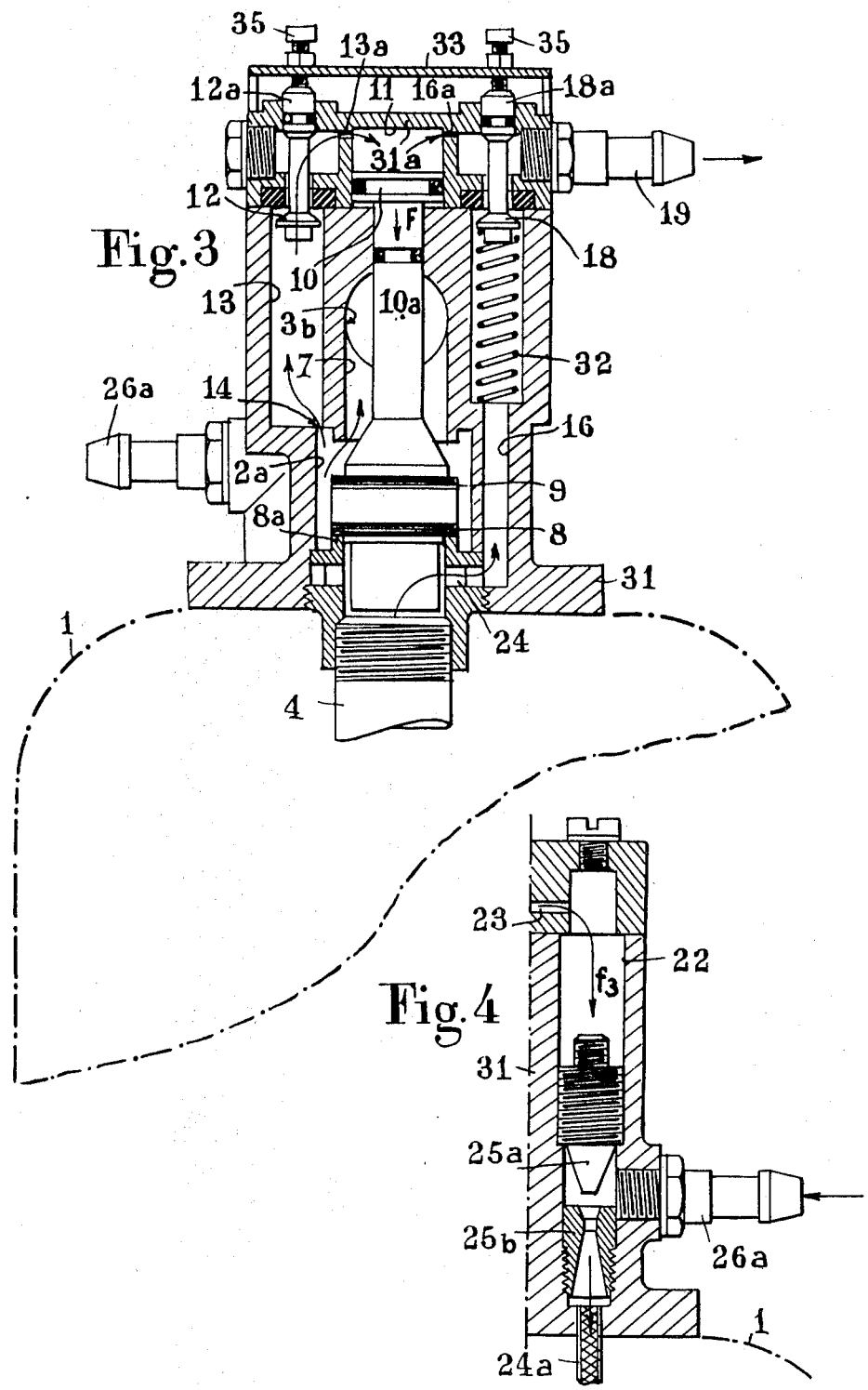

WATER SOFTENER VALVE DEVICE

This invention relates to valve means adapted to be associated with the reservoir of a water-softening apparatus of the type operating by the action of ion exchange resins.

Devices of this type comprise of course an inlet duct through which the water to be treated is introduced into the reservoir, and an outlet duct through which the treated water is extracted from the reservoir. However, they further comprise a number of ancillary circuits as well as suitable valve and like control means for ensuring the various fluid connections necessary for the operation of the water softener.

In fact, a composition adapted to regenerate the ion exchange resins when these are saturated must be injected periodically into said reservoir. Furthermore, another periodic operation consists in rinsing the interior of the reservoir of the water softener.

However, hitherto known valve devices for providing the necessary fluid connections permitting the proper performance of these various operations are not entirely satisfactory. In fact, some of these devices are extremely complicated and therefore extremely costly. Besides, the actuation of these devices is attended by a number of difficulties and involves the use of relatively elaborate mechanisms.

Nevertheless, it has already been proposed to provide an apparatus comprising a particularly simple arrangement which is so designed that the various component circuits and elements of the apparatus can be grouped into a same valve body.

In this device the two inlet and outlet ducts are interconnected by a bypass controlled by a reversing valve responsive to a double-action piston.

This device further comprises a control system actuatable by any known and suitable mechanism in order to provide the various connections necessary for the proper and normal operation of the apparatus, or alternately the various rinsing and treatment resin regenerating operations.

It is essential object of the present invention to provide an apparatus of this type but of which the structure is still simpler so as to afford a substantial reduction in the cost of the assembly, the arrangement contemplated herein permitting however a perfectly reliable operation of the apparatus.

This device is characterized essentially in that its operation is controlled by means of two valves adapted to be actuated through any suitable mechanism for occupying either an open position or a closed position, said valves being inserted in two branch lines extending from the inlet duct, respectively upstream and downstream of the inlet duct, the first branch line leading into the chamber in which the piston controlling the relevant valve is slidably mounted, the second branch line opening into a drain duct, a third branch line being provided between the outlet duct and an orifice opening into the reservoir in order to permit the delivery into this reservoir of a stream of rinsing water, and a product for regenerating the treatment resins when the two control valves are in their closed position, whereby the direction of the fluid in the reservoir is reversed.

According to another feature characterizing this invention, said outlet duct comprises a free valve branched off the aforesaid bypass and adapted to be closed automatically when said bypass is open.

According to a further feature of this invention the chamber of the piston controlling the reversing valve communicates both with said first and second branch lines extending from said inlet duct, respectively upstream and downstream of said reversing valve, but in addition the orifice providing the communication with the second branch line leading to said drain duct has a smaller cross-sectional passage area than the passage providing the communication with the first branch line.

However, other features and advantages of the device constituting the subject matter of this invention will appear as the following description proceeds with reference to the attached drawing illustrating diagrammatically by way of example typical forms of embodiment of the invention. In the drawing:

FIG. 2 is a sectional view showing an apparatus according to first exemplary form of embodiment of the invention;

FIG. 3 is a section taken along the line III—III of FIG. 2, and

FIG. 4 is a fragmentary section taken along the line IV—IV of FIG. 2.

Figure 1:
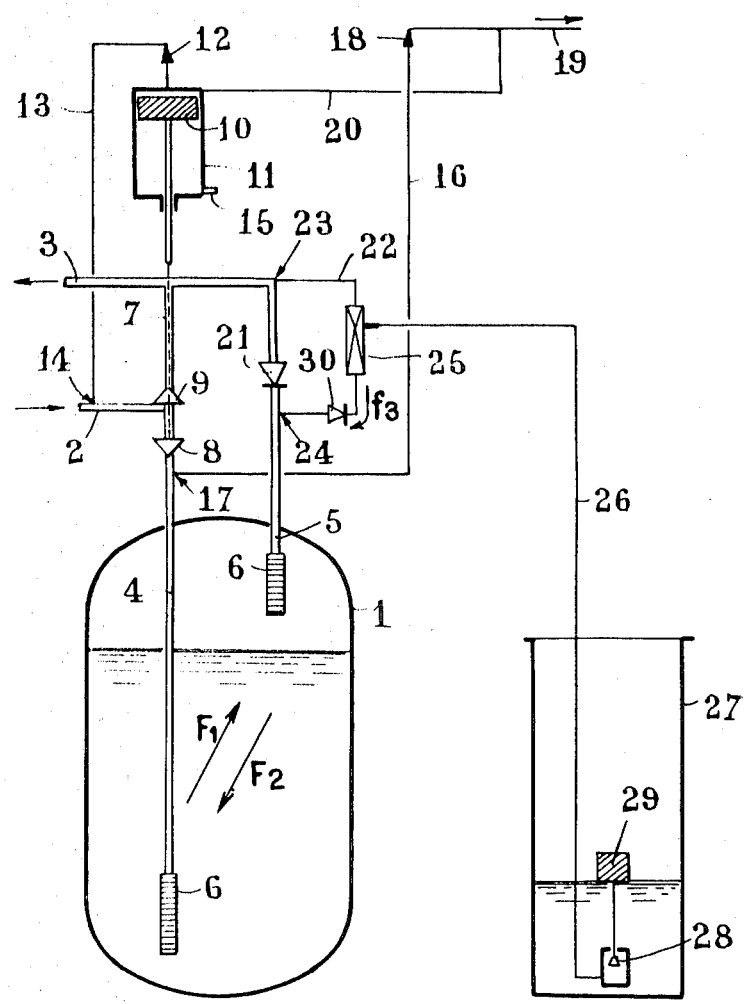
FIG. 1 illustrates the circuit diagram incorporating the various valve means of the device of this invention.

The arrangement of the valve device according to this invention is clearly illustrated in the diagram of FIG. 1 showing the various circuits contemplated in this device, as well as the various valve means incorporated in said device.

The device of this invention is adapted to be associated with the reservoir or tank 1 of a water softener of the type operating by the action of ion exchange resins disposed within said reservoir. The device of this invention comprises to this end an inlet duct 2 for supplying water to be treated to said reservoir and an outlet duct 3 for the treated water flowing from said reservoir.

These ducts 2 and 3 are connected to vertical tubes 4 and 5 respectively which extend into the reservoir and are provided at their lower end with filter means 6.

The first tube 4 is relatively long and opens into the lower portion of reservoir 1, and the second tube 5 is shorter and opens into the upper portion of the reservoir.

Both ducts 2 and 3 corresponding to the main fluid circuit of the device, are interconnected by a bypass 7 controlled by a reversing valve 8, 9 responsive to a piston 10. This piston 10 is slidably mounted in a chamber 11 having one end connected via a valve 12 to a branch line 13 extending from said inlet duct 2 at a point 14 located upstream of the reversing valve 8, 9 and the opposite end of chamber 11 provided with a hole 15 constituting an air vent.

Another branch line 16 also extends from the inlet duct 2 but at a point 17 thereof located downstream of the reversing valve 8. This branch line comprises a valve 18 similar to valve 12, both valves 12, 18 being the only means provided for controlling the device of this invention.

Beyond valve 18, the second branch line 16 communicates with a drain circuit 19 adapted to be connected to the sewer. However, the end of chamber 11 which is connected to the first branch line 13 is connected in turn to the drain duct 19 via a connecting passage or line 20 opening downstream of valve 18, as shown.

The outlet duct 3 for the treated water has inserted therein a free valve 21 of the nonreturn type which is disposed in parallel to the aforesaid bypass 7. This valve 21 is adapted to open automatically under the water pressure when water circulates in the normal direction, and to close, also automatically, when valve 18 and bypass 7 are open.

A third branch line 22 is provided for bypassing in parallel the valve 21 in this last case. This branch line extends from a point 23 located in the outlet duct 3 downstream of valve 21 and to leads to a point 24 located downstream thereof, the terms "downstream" and "upstream" being intended according to the normal direction of flow of the water to be treated.

Besides, this third branch line comprises hydraulic injection means 25 operating according to the well-known "Giffard" device. This system is adapted to inject a composition capable of regenerating the ion exchange resins contained in the reservoir 1. It is also adapted to permit the passage of the water circulation necessary for performing the slow reservoir rinsing operation as will be explained presently.

To this end, this system is connected via a pipe line 26 to a vessel 27 containing a suitable brine solution, this vessel being provided if desired with a control valve 28 responsive to a float 29.

Finally, the branch line 22 may comprise a nonreturn valve 30 permitting the water circulation only in the direction of the arrow $f_3$. However, this valve is not compulsory, especially in the injection system 25, due to its inherent design, is capable of acting as an output limiter.

The device thus arranged is adapted, according to the position of the two control valves 12 and 18, to ensure either the normal operation of the water softener or the various periodic operations necessary for the proper maintenance of the apparatus, i.e. the regeneration of the treatment resins as well as the loosening and rinsing thereof.

In fact, to obtain the normal operation of the water softener it is only necessary that the two control valves 12 and 18 be closed. On the other hand, to obtain the mode of operation permitting the periodic regeneration and rising operations, these two valves must be open.

The following table shows the positions of the various valves means of the device in either case, the letters "O" and "C" denoting the open and closed positions of the relevant valves, respectively.

| Treatment mode | Control valve | | Other valves | | | | Direction of flow of water in reservoir |
|---|---|---|---|---|---|---|---|
| | 12 | 18 | 8 | 9 | | 21 | 28 | |
| Normal operation | C | C | O | C | Immaterial | C | $F_1$ |
| Regeneration rinsing. | O | O | C | O | C | | O | $F_2$ |

However, it should be noted that the second position of the valves of this device provides not a single operation but a complete range of operations, namely;

1. Firstly, loosening the packed resins contained in reservoir 1, by virtue of the reversal of the direction of flow within this reservoir, and simultaneously the injection of brine from vessel 27;
2. Secondly, the rinsing of the same resins when the brine injection is completed;
3. Finally, the venting of any air possibly introduced into the reservoir and the filling of the brine vessel 27 with water.

However, these various operations will be explained more in detail subsequent to the description of a practical form of embodiment of the device of this invention.

In fact, FIGS. 2 to 4 illustrate by way of example a possible form of embodiment of this device.

In these three Figures, the reference numerals of FIG. 1 are reproduced for designating the fluid circuits or component elements of the present device, which correspond to the various elements of the diagram of said FIG. 1. However, in certain cases, these reference numerals are completed by an index letter for differentiating them.

Thus, the body 3 of the device of this invention comprises an inlet duct consisting of two successive sections 2a and 2b, as well as an outlet duct consisting of two successive sections 3a and 3b. Between the sections 2a and 3b of these ducts is a bypass 7 controlled by a reversing valve 8, 9.

One face of this valve is adapted to engage a seat 8a formed in the inlet duct for closing same, and in this case its opposite face 9 opens the bypass 7. In fact, this other face is adapted to engage another seat provided in said bypass 7 for closing same when the inlet duct is open.

This reversing valve is rigid with the rod 10a of its control piston 10. The latter, as already explained, is slidably mounted in a chamber 11 having one end connected to a branch line 13 extending from an orifice 14 formed in the wall of the first section 2a of said inlet duct. This branch line communicates with chamber 11 via a passage 13a.

Besides, this branch line 13 has inserted therein one of the control valves of the present device, namely valve 12. The control rod of this valve 12 extends upwards and comprises a head 12a projecting above the body of the cylinder head 31a of the device.

The other branch line 16 provided in said body 31 extends between the second section 2b of the inlet duct and an outlet nozzle 19 permitting the coupling of a drain duct or line leading to the sewer (not shown).

The outlet orifices or ports 24 of this second branch line 16 may be formed within the member 8a constituting the seat of valve 8.

At its opposite end this branch line communicates with chamber 11 via a gauged orifice 16a having a cross-sectional passage area considerably smaller than that of passage 13a providing the communication between this chamber 11 and the first branch line 13.

Of course, the second branch line 16 encloses the other control valve of the device, i.e. valve 18.

Similarly, as in the case of valve 12, the control rod of valve 18 comprises a head 18a projecting above the body of the device. However, a spring 32 may possibly be provided for returning the valve 18 to its closed position.

The rods for actuating these two control valves are responsive to a lever 33 fulcrumed to a pin 34 and adapted to actuated both rods via a pair of adjustment screws 35 for depressing the valves to their open positions, or in contrast thereto permitting their upward movement to their seated or closed positions.

This lever may itself be actuated by means of any suitable control member adapted to move same to either of its operative positions.

The first section 3a of the return duct comprises a free valve 21 normally engaging a seat 21a. However, under normal operating conditions when water is allowed to return to the reservoir it lifts this valve so that it can flow into the second section 3b of the return duct.

The third branch line 22 provided in the present device extends form a port 23 formed in the outlet duct 3, downstream of the free valve 21, considering the normal direction of flow of the water to be treated.

A nozzle 26a opens into this branch line and is adapted to be connected to the line 26 extending from the brine containing vessel 27.

On either side of the orifice of this nozzle 26a the branch line 22 comprises a jet 25a and a Venturi 25b.

The assembly thus obtained is adapted to cause the brine solution contained in the vessel 27 to be sucked up when the water circulates in said branch line in the direction of the arrow $f_3$.

As in the case of the theoretical diagram of FIG. 1, this branch line can lead to the first section 3a of the return duct, upstream of the aforesaid free valve 21, considering the normal direction of water flow.

However, for reasons of greater simplicity in the manufacture of the various component elements, this branch line leads in the present instance to a nozzle 24a opening into the reservoir 1, this arrangement providing in any case the same result.

Possibly, this branch line may comprise a nonreturn valve 30 as contemplated in the theoretical diagram of FIG. 1. Nevertheless, this nonreturn valve may be dispensed with if the Venturi of the injection system 25 is capable of acting as an output limiter.

As can be seen in FIG. 3 the two branch lines 13 and 16 extend parallel to said bypass 7 and on either side thereof. The chamber 11 enclosing the control piston 10 is also disposed between said two branch lines.

As to the third branch line 22, it is disposed on one side of body 31. Now the arrangement thus described is advantageous in that it reduces appreciably the overall dimensions of the assembly. However, it will readily occur to those conversant with the art that this reduction in the dimensions of the device is permitted by the very general principle of the present device.

This device operates as follows;:

1. Normal Operation

In this case both control valves 12 and 18 are lifted to their seated or closed position.

Under these conditions, no pressure is exerted on piston 10 since its chamber 11 is connected to the sewer via orifice 16a. Therefore, the reversing valve is in the position closing the bypass 7 and the two successive sections 2a and 2b of the inlet duct communicate with each other.

The water to be treated is thus delivered to the bottom of reservoir 1 via duct 4. It subsequently rises in the direction of the arrow $F_1$ through the mass of ion exchange resins, thus ensuring the treatment of the input water.

Then, this water escapes from the top of reservoir 1 via tube 5 and flows via outlet duct sections 3a and 3b while pushing the free valve 21.

Of course, during this operation, the three branch lines 13, 16 and 22 are inoperative.

2. Resin regeneration and rinsing operations

As already explained in the foregoing, these various operations are obtained by a mode of operation of the device which differs however from its normal operation.

This different mode of operation is obtained when both control valves 12 and 18 are depressed to their unseated or open positions.

In fact, the following operations are then obtained:

a. Supply of untreated water during the regeneration and rinsing operations performed in the reservoir Due to the opening of valve 12, the untreated feed water entering into the first section 2a of inlet duct 2 can flow through the first branch line 13 into chamber 11.

It will thus exert a pressure on piston 10 to move same in the direction of arrow F, whereby the reversing valve 8, 9 is moved to the position causing at the same time the opening of bypass 7 and the separation of the two successive sections 2a and 2b of the inlet duct. This is actually the position shown in FIGS. 2 and 3.

Under these conditions, water continues to be supplied to the installation.

b. Loosening of the ion exchange resins, and regeneration of said resins

Due to the water pressure prevailing in the second section 3b of the return duct, the valve 21 is now open.

However, the water circulating in this second section 3b of the return duct can now flow via portion 23 through the third branch line 22 in the direction $f_3$.

This is attended by the suction of brine solution contained in vessel 27, whereby the reservoir 1 receives via nozzle 24a the water entraining this solution. Thus, the ion exchange resins are regenerated. However, this operation is also attended by loosening of the resins, due to the reversal in the direction of flow of the water in the reservoir.

In fact, water is then exhausted via tube 4 since it can subsequently escape via the second branch line 16 to the drain duct 19, valve 18 being open. Water is thus caused to circulate in the direction of the arrow $F_2$ in the reservoir, since tube 4 extends down to the lower portion thereof.

In this respect, it may be noted that the injection of brine by using an upward stream is attended by a maximum efficiency as far as the ion exchange resins regeneration is concerned, since the formation of preferential passages is safely avoided within the resin mass. In fact, in two-cycle water softeners of the type wherein the resin regeneration takes place in the upward direction, only about one-third of the resin mass is regenerated, due to the formation of preferential passages in said mass.

Besides, the very satisfactory efficiency obtained with the device of this invention is also due to the fact that the resin particles are loosened during their regeneration, thus facilitating the penetration of brine solution through the resin mass.

c. Rinsing

When the whole of the brine solution contained in vessel 27 has been injected through the resins, the water circulating in the direction $f_3$ within the third branch line 22 continues to flow into said reservoir, thus rinsing the resins. Of course, this operation still takes place in the upward direction $F_2$.

It will be readily understood that during this rinsing operation a certain amount of air is likely to be introduced into the reservoir 1, due to the suction exerted in vessel 27 when no brine solutions is left therein.

3. Restoring the apparatus for normal operation

The apparatus is restored to normal operating conditions by simply raising the control lever to permit the reseating of both valves 12 and 18.

In fact, valve 12 is then closed immediately since it is acted upon by the water pressure prevailing in inlet duct 2a.

As to the other valve 18, it is closed by the force of spring 32, especially when the hydraulic pressure is restored in reservoir 1 after all the air previously introduced into it has been exhausted.

Moreover, the reversing valve 8, 9 can resume its position to close the bypass 7 and open the inlet duct, since no pressure is exerted anymore on piston 10.

However, the air previously introduced into reservoir 1 is expelled therefrom as this reservoir is being again filled up with water.

Besides, a certain quantity of water penetrates into the vessel 27 via branch line 22 and pipeline 26, so as to dissolve a certain amount of brine, in order to prepare, so to say, a reserve of brine solution for the subsequent regeneration of the ion-exchange resins contained in reservoir 1. In fact, the length of the rod connecting the valve 28 to its float 29 is calculated with a view to cause this valve to be seated and stop the water supply when the desired quantity of water is contained in vessel 27.

Theoretically, a nonreturn valve 30 should be provided after the Venturi 25b. However, this valve is necessary only in case the passage provided in said Venturi is relatively large so that the Venturi cannot act by itself as a nonreturn valve or output limiter.

In fact, in this case the circulation of water in the direction opposite to that shown by the arrow $f_4$ would be objectionable in that it would prevent a normal supply from reaching the brine vessel 27 due to a premature closing of valve 28.

Now this closing of valve 28 must compulsorily take place under the control of float 29. However, an alternative arrangement may consist in inserting an output limiting device in pipe line 26.

As can be readily understood from the above description with reference to the accompanying drawing this valve device is attended by obvious advantageous features in comparison with other similar devices known in the art.

One of these advantageous features resides in the fact that during the normal operation of the device water flows upwards (direction $F_1$) through the mass of ion exchange resins.

In fact, the water circulation in this direction causes resin particles to be entrained upwards each time water is tapped from the apparatus, whereafter the same resin particles descend by gravity, thus preventing the premature clogging of the inlet and outlet filters 6.

However, the essential feature characterizing this invention lies in the extreme simplicity of the mode of operation of the device constituting the subject matter thereof. This feature obviously leads to another important feature, namely the fact that extremely simple control means can be devised for operating the apparatus.

In this respect, considering the fact that the modes of operation of the apparatus are determined by two useful or operative positions of valves 12 and 18, the control lever 33 of these valves can be actuated by means of a simple rotary cam 36 driven from the output shaft 37 of a small electric motor operating continuously. The output shaft 37 revolves of course at a very low speed, so that the cam 36 be brought to its operative position only once in 24 hours and causes in this position the downward tilting of lever 33 and therefore the opening of both control valves 12 and 18.

Under these conditions the present device is capable of producing automatically the regeneration and rinsing operations necessary for the corresponding water softener, without resorting to a master clock or any other programming device of the type providing a periodic control action.

In this respect, it may also be noted that the device of this invention is designed more particularly for water softeners for home use, i.e. utilizing a relatively small amount of ion-exchange resins.

Now, the present device is adapted to multiply the number of resin regeneration operations by performing same with a minimum water consumption and a low brine consumption, whereby the same result as those obtainable with considerably larger devices can be obtained. However, this result is obviously obtained by using an equipment of considerably lower cost.

What I claim is:

1. In a water softener having a treatment reservoir which contains ion exchange resins therein the improvement comprising a valve associated with the treatment reservoir, said valve comprising in combination a body, a pair of ducts formed in said body and constituting respectively the inlet duct for the water to be treated, which leads to said reservoir, and an outlet duct for the treated water which returns from said reservoir, a bypass between said ducts, a reversing valve inserted in said inlet duct for closing said inlet duct while opening said bypass or closing said bypass while opening said inlet duct, a piston for controlling the movement of said reversing valve, a chamber in which said piston is slidably mounted, a drain duct, a pair of branch lines extending from said inlet duct, the first branch line extending from a point located upstream of said reversing valve to said chamber, and the second branch line from a point located downstream of said reversing valve to said drain duct, a pair of valves mounted in said first and second branch lines respectively, means for conjointly and simultaneously moving said valves to their open position and closed position, an orifice opening into said treatment reservoir, a third branch line extending from said outlet duct and said orifice, another duct opening into said third branch line, said another duct being connected to a vessel containing a product capable of regenerating the ion exchange resins contained in said treatment reservoir.

2. A valve as set forth in claim 1, characterized in that a communication orifice is provided between said second branch line and the chamber containing said reversing valve control piston, the cross-sectional area of said orifice being smaller than that of the orifice through which said chamber communicates with said first branch line.

3. A valve as set forth in claim 1, wherein said outlet duct, at a point located upstream of said bypass between said inlet duct and said outlet duct, has inserted therein a valve member which is automatically closed when said bypass is open.

4. A valve as set forth in claim 1, characterized in that said pair of branch lines which extend from said inlet duct are parallel to said bypass, said branch lines being disposed on either side of said bypass, the chamber containing said reversing valve control piston being disposed between said two branch lines.

5. A valve as set forth in claim 1, characterized in that the valves provided in said first pair of branch lines comprise sliding control rods emerging from the body of said valve, and means for actuating said control rods, said means for actuating said control rods being disposed outside of said valve body.

6. A valve as set forth in claim 1, wherein said downstream orifice of said inlet duct for the water to be treated carries a tube, said tube extending down nearly to the bottom of said treatment reservoir, and the upstream orifice of said return duct carries a tube shorter than the tube carried by said inlet duct which penetrates into said reservoir.